(12) United States Patent
Zimmer et al.

(10) Patent No.: US 8,391,913 B2
(45) Date of Patent: Mar. 5, 2013

(54) SOFTWARE-DEFINED RADIO SUPPORT IN SEQUESTERED PARTITIONS

(75) Inventors: Vincent J. Zimmer, Federal Way, WA (US); Michael A. Rothman, Puyallup, WA (US); Palsamy Sakthikumar, Puyallup, WA (US); Mallik Bulusu, Olympia, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1188 days.

(21) Appl. No.: 11/779,803

(22) Filed: Jul. 18, 2007

(65) Prior Publication Data

US 2009/0023414 A1 Jan. 22, 2009

(51) Int. Cl.
*H04B 1/26* (2006.01)
(52) U.S. Cl. .................................... 455/550.1; 375/316
(58) Field of Classification Search .................. 455/323, 455/550.1–556.2; 709/201–226
See application file for complete search history.

(56) References Cited

U.S. PATENT DOCUMENTS

| | | | |
|---|---|---|---|
| 6,704,802 B1* | 3/2004 | Finch et al. | 719/315 |
| 2003/0099358 A1* | 5/2003 | Michael et al. | 380/270 |
| 2005/0108382 A1* | 5/2005 | Murotake et al. | 709/223 |
| 2006/0112384 A1* | 5/2006 | Frank et al. | 717/168 |
| 2006/0156399 A1* | 7/2006 | Parmar et al. | 726/22 |
| 2006/0212870 A1* | 9/2006 | Arndt et al. | 718/104 |
| 2007/0073896 A1* | 3/2007 | Rothman et al. | 709/232 |
| 2007/0105587 A1* | 5/2007 | Lu | 455/552.1 |
| 2008/0016313 A1* | 1/2008 | Murotake et al. | 711/173 |
| 2008/0022401 A1* | 1/2008 | Cameron et al. | 726/22 |
| 2008/0235457 A1* | 9/2008 | Hasenplaugh et al. | 711/130 |
| 2009/0170444 A1* | 7/2009 | Retnasothie et al. | 455/73 |
| 2009/0175381 A1* | 7/2009 | Bougard | 375/316 |
| 2009/0228686 A1* | 9/2009 | Koenck et al. | 712/32 |
| 2009/0274202 A1* | 11/2009 | Hanke et al. | 375/220 |

OTHER PUBLICATIONS

"Green Hills Platform for Software Defined Radio" to Green Hills (herein Green Hills) (with reference to way back machine http://web.archive.org/web/20060710200748/http:// www.ghs.com/]products/SDR.html).*
Bougard et al. "A Scalable Baseband Platform for Energy-Efficient Reactive Software-Defined-Radio." Cognitive Radio Oriented Wireless Networks and Communications, 2006. 1st International Conference on. Jun. 8-10, 2006. pp. 1-5.*

* cited by examiner

*Primary Examiner* — Kamran Afshar
*Assistant Examiner* — Kashif Siddiqui
(74) *Attorney, Agent, or Firm* — Schwabe, Williamson & Wyatt, P.C.

(57) ABSTRACT

A software-defined radio (SDR) capability may be provided in a general purpose, many core processing system by sequestering one or more partitions running on one or more cores and instantiating a communications capability by having discrete SDR functions performed by the sequestered partitions. Each SDR module embodied in a sequestered partition may be independently upgraded without modifying the hardware of the underlying processing system. By executing SDR modules in cores not accessible by application programs and/or an operating system (OS), a better Quality of Service (QoS) may be provided for wireless communications on the general purpose, multi-core processing system. An embodiment comprises isolating a core of a many core processing system as a sequestered partition, loading a software-defined radio module onto the core, and executing the software-defined module to implement wireless communications.

20 Claims, 3 Drawing Sheets

SOFTWARE-DEFINED RADIO SUPPORT IN SEQUESTERED PARTITIONS

BACKGROUND

Many different standards and protocols have been developed for wireless communications. These standards and protocols are constantly evolving. It is difficult for a hardwired radio device to keep up with the evolving standards and protocols. As a result, many wireless communication devices rapidly become obsolete. In an attempt to overcome this problem, a software-defined radio (SDR) has been defined (see www-sdrforum-org). An SDR is a radio communication system which can tune to any frequency band and receive any modulation across a large frequency spectrum by means of programmable hardware which is controlled by software. An SDR performs significant amounts of signal processing in a general purpose computing environment, or in a reconfigurable piece of digital electronics. The goal of this design is to produce a radio that can receive and transmit a new form of radio standard or protocol just by loading and executing new software. SDRs have significant utility for the military and cell phone services, both of which must serve a wide variety of changing radio standards and protocols in real time. The hardware of a SDR typically consists of a superheterodyne radio frequency (RF) front end which converts RF signals from (and to) analog infrared (IF) signals, analog to digital converters, and digital to analog converters, which are used to convert a digitized IF signal from and to analog form, respectively.

One problem with SDR deployment is that SDRs require significant computational resources and isochrony. Implementations of SDR within a full, multiple address space, multi-user Operating System (OS) on a general purpose computing system cannot meet the quality of service (QoS) deadlines for various protocols and still maintain a usable OS for the user. Thus, the widespread use of SDRs in general purpose computer systems have been delayed.

DETAILED DESCRIPTION

Embodiments of the present invention provide for SDR capability in a general purpose, many core processing system by sequestering one or more partitions running on one or more cores and instantiating a communications capability by having discrete SDR functions performed by the sequestered partitions. Each SDR module embodied in a sequestered partition may be independently upgraded without modifying the hardware of the underlying processing system. By executing SDR modules in cores not accessible by application programs and/or an operating system (OS), a better QoS may be provided for wireless communications on the general purpose, multi-core processing system.

Processor-based systems, such as personal computers, servers, laptop computers, personal digital assistants (PDAs) and other processor-based devices, such as "smart" phones, game consoles, set-top boxes and others, may be multiprocessor or multi-core systems. For example, an Intel® architecture processor in such a system may have two, four, eight, 16, 32 or some other number of cores. Such multiprocessor or multi-core systems are generally referred to as many core systems in the following description.

Figure 1:
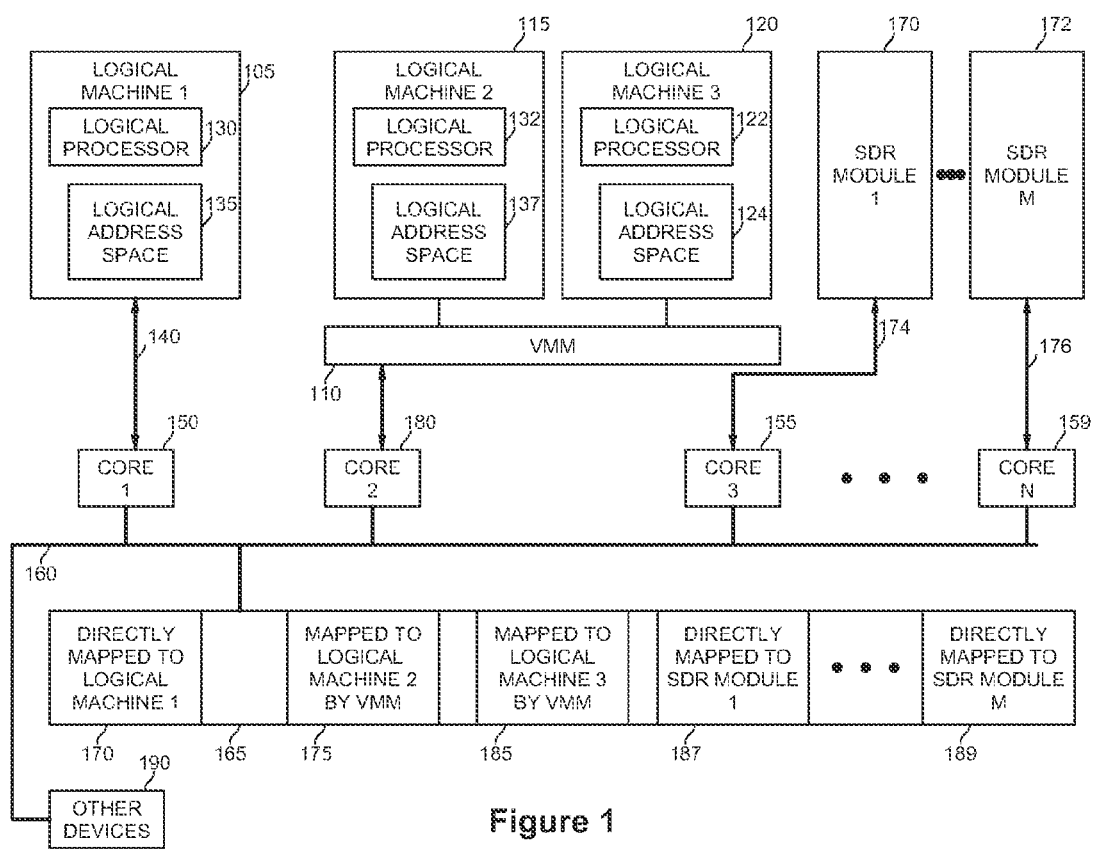
FIG. 1 depicts a many core system in one embodiment.

A many core system is a term used herein to refer to a processing system such as that depicted in FIG. 1. As in the figure, a many core system may include a plurality of processor cores or processors such as cores 150, 180, 155, and 159. The term core as used herein may refer, for example, to a single processor of a multiprocessor system, or to a processor core of a multi-core processor. The processing system may have multiple processors, each of which may have multiple cores. In general, the system has a set of busses such as bus 160 that interconnects the cores and a memory 165 with other devices 190 on the bus. These other devices may include, for example, well-known graphics, storage, input and output devices. As shown in the system depicted, the cores may form the basis of several logical machines, each presenting an abstraction of processor and memory, such as logical machines 1, 2 and 3, at 105, 115, and 120. Each logical machine provides a logical view of a processor and memory to programs executing on the logical machine. For example, logical machine 1 105 includes logical processor 130 and logical address space 135, logical machine 2 115 includes logical processor 132 and logical address space 137, and logical machine 3 120 includes logical processor 122 and logical address space 124. In some instances such as with logical machine 1 at 105, a core such as core 1 150 and a segment of the system memory 170 may be directly mapped 140 to the logical machine 105 much as in a single processor system. In other instances, logical machines may actually be virtual machines such as the machines 115 and 120, that may in turn execute via a virtual machine monitor (VMM) 110 that itself executes directly on a core such as core 2 at 180. The VMM may then partition the memory available to its core 180 into segments 175 and 185 allocated to the virtual logical machines 115 and 120, respectively. General purpose logical machines of a many core system such as 105, 115 and 120 may also be referred to as (logical) address spaces of the system, because each logical machine defines an address space within which a logical memory and a register set of a processor may be referenced. Application programs and operating systems may be executed by logical machines 1, 2, and 3.

In one embodiment of the present invention, additional special purpose logical machines may also be provided in the many core system. A plurality of software-defined radio (SDR) modules may be provided, with one or more SDR modules being directly mapped to a core. For example, SDR module 1 170 may be directly mapped 174 to core 3 155, and SDR module M 172 may be directly mapped 176 to core N 159. There may be any number of SDR modules mapped to cores in the system, depending on the design constraints of the processing system (e.g., the number of available cores, the capabilities of each SDR module, the throughput required for the system, and so on). In various embodiments, the mapping of SDR module to core may be one SDR module to one core, or multiple SDR modules to one core. Each SDR module may have its own section of memory 165 allocated to it. For example, SDR module 1 170 may be mapped to memory section 187, and SDR module M may be mapped to memory section 189. As shown in FIG. 1, the many cores of the processing system share the memory.

An SDR module may provide processing for a discrete SDR function. For example, various SDR functions may comprise command and control, input data handling, data acquisition synchronization, multi-user detection algorithms, multi-path profiling, signal update processing, demodulation, or output data handling.

In one embodiment, one or more cores of the many core processing system may be isolated from the operating system (OS) for the purposes of providing additional hardware capability for SDR processing. In one embodiment, the SDR modules mapped to cores 3 through N may be hidden, or "sequestered" according to known methods from the processing being handled by the other cores (i.e., cores 1 and 2). In one embodiment, this isolation by setting up of a sequestered partition may be implemented by using platform resource layer (PRL) technology as is known in the art. A partition may comprise a SDR module as shown in FIG. 1. To sequester a partition, a subset of the processing system's resources may be segregated from the OS (i.e., set apart from the resources made visible to the OS). For example, application programs and the OS (not shown) executing on core 1 and/or core 2 cannot access, and have no knowledge of, SDR modules 1 through M executing on cores 3 through N. Although in FIG. 1 each SDR module is represented by a partition on a single core, a partition may contain one or more physical processors or logical processors, or any combination thereof (e.g., a hyper-thread or other type of logical separable processing element), and enough memory to run the SDR module code.

Sequestering of processing system resources may be performed by the system's firmware before the OS loads. For example, in one embodiment, memory is sequestered by manipulating the physical memory map provided to the OS when the OS is booted up. More specifically, in one embodiment, a block of memory 187 or 189 is removed from the view of the OS by resizing or removing entries from the memory map. Moreover, in one embodiment, core 3 155 through core N 159 (which may be a hyper-thread or a physically distinct processor) may be sequestered by modifying the Advanced Configuration and Power Interface (ACPI) table passed to the OS at boot time to exclude the IDs of the sequestered core 3 155 through core N 159 and each core's Advanced Programmable Interrupt Controller (APIC) from the table. For processors that support hyper-threading, concealing a physical core includes excluding both of its hyper-threads from the ACPI table.

As should be evident to the artisan, a practically unlimited set of variations of the many core system depicted in the figure is possible. In particular, the number of cores, and the mapping from cores to logical machines may be varied; in some embodiment systems, there may be no virtual machines present, while in others all the logical machines may be virtual. In some embodiments, only one core may be segregated for SDR processing. In others multiple cores may be available for SDR processing as described above. Similar embodiments are possible in multi-processor systems where, instead of multiple cores, multiple separate processors may be present. Embodiments may be implemented in hybrid systems in which multiple processors, some of which may themselves be multi-core processors, are present. Many other variations are possible.

Figure 2:
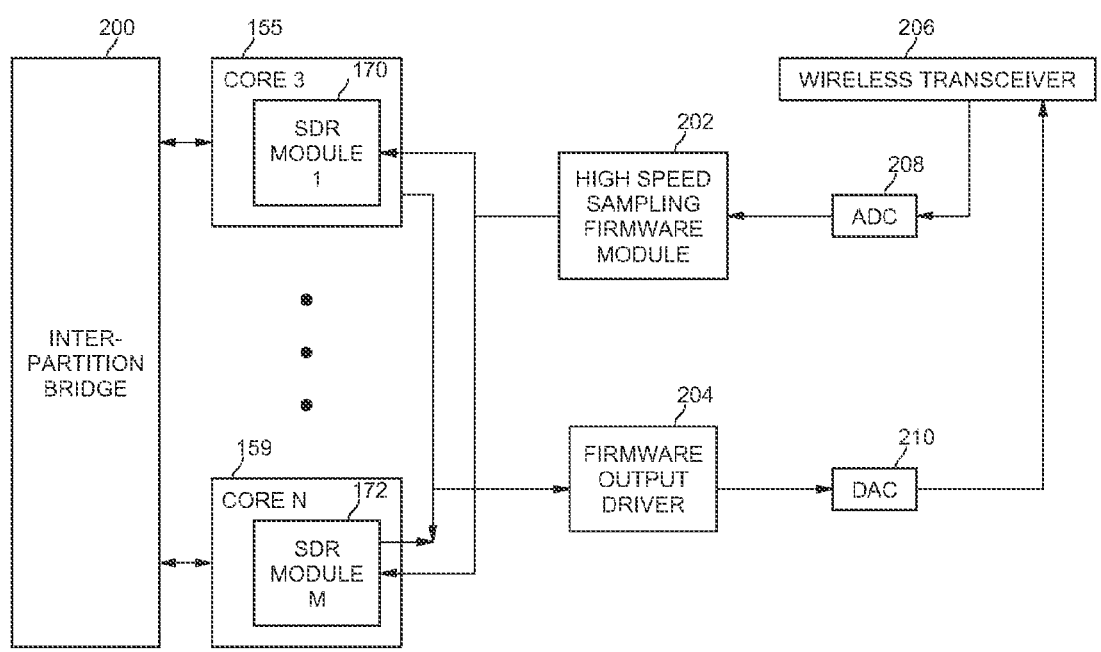
FIG. 2 depicts a logical block diagram of one embodiment.

FIG. 2 is a logical block diagram of an arrangement of SDR modules in one embodiment. Wireless communications may be provided by the combination of the elements shown. Wireless transceiver 206 may be included to receive and transmit analog communications signals. An analog communications signal may be received by wireless transceiver 206 and converted to a digital form by analog to digital converter (ADC) 208. High speed sampling firmware module 202 samples the input signal data and forwards the input signal data to one or more SDR modules executing on one or more cores. For example, SDR module 1 170 executing on core 3 155 may receive the input signal data and commence processing of the data. Subsequently, data produced by SDR module 1 for example may be forwarded to another SDR module executing in another core for additional processing. Communication between SDR modules executing on cores may be performed via inter-partition bridge (IPB) 200. The IPB may be instantiated for each SDR to provide for an emulated wireless network interface controller (NIC) memory-mapped channel for each partition. The IPB may be a trusted channel of communication that allows two trusted partitions or sub-systems to communicate in accordance with an expected security policy such as cryptographic keys. In several embodiments, the IPB may comprise a shared memory buffer. Since there are multiple SDR modules executing on multiple cores, significant signal processing may be performed in parallel across multiple cores. Output data produced by one of the SDR modules may be transmitted by sending the output data to firmware output driver 204. The driver prepares the output data as needed and forwards the output data to digital to analog converter (DAC) 210, for subsequent transmission by wireless transceiver 206.

Each SDR module may be perform a specific wireless communications signal processing function, and each SDR module may be executed on a partition such that application programs and the OS running on the processing cannot interfere with overall wireless communications throughput. Thus, improved performance and better QoS may be achieved.

Figure 3:
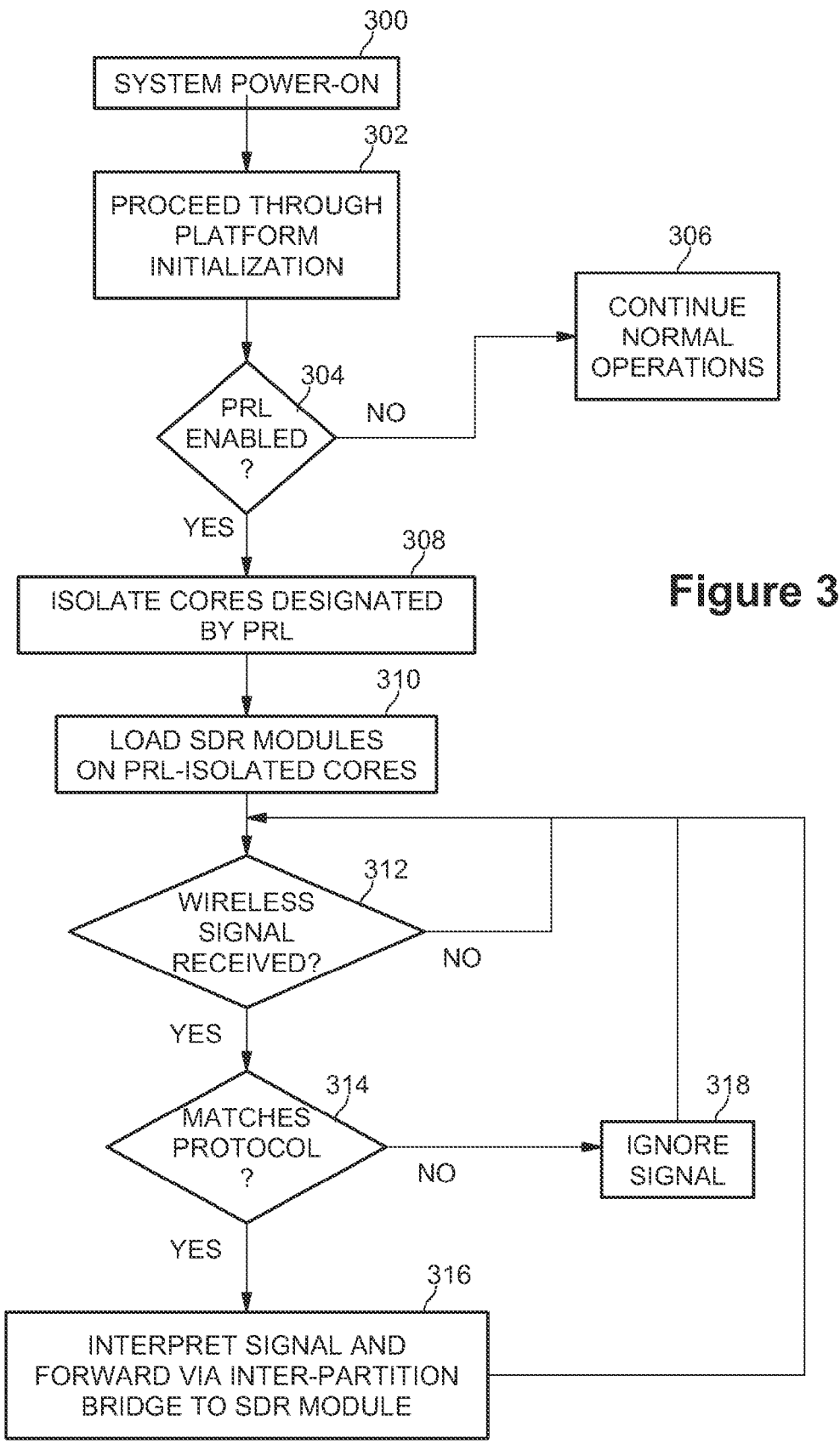
FIG. 3 depicts the flow of processing at high level in one embodiment.

FIG. 3 is a flow diagram depicting high level processing operations of an embodiment of the present invention. At block 300, the processing system maybe powered on. At block 302, the system may proceed through platform initialization as normal. At block 304, a check is made to determine if platform resource layer (PRL) capabilities are enabled in the processing system to provide for sequestered partitions. If PRL is not enabled, then normal operations may continue at block 306. If PRL is enabled, cores designated by the PRL may be isolated at block 308. In one embodiment, the isolation may be achieved by programming advanced match range registers (AMRRs) within the processor. This partitions memory for the sequestered cores. Next, the SDR modules may be loaded onto PRL-isolated cores at block 310. In at least one embodiment, the SDR modules may be securely loaded onto the isolated cores using the techniques described in the pending patent application by Lyle Cool and Vincent Zimmer entitled "Methods and Arrangements to Launch Trusted, Co-Existing Environments", Ser. No. 11/527,180, filed Sep. 26, 2006, assigned to the same entity as the present application, and incorporated herein by reference. Securely loading the SDR modules means that the SDR modules become trusted and verified once they are loaded, and unauthorized attempts to change or "hack" the functionality of the loaded SDR modules may be detected or deterred. In embodiments of the present invention, the SDR modules are thus trusted when executing on the cores for purposes of wireless communications processing.

At block 312, if a wireless signal is received, then processing continues with block 314. At block 314, if the received signal matches a protocol that is supported by the processing system, then the received signal data may be processing at block 316. Otherwise, the signal may be ignored at block 318. At block 316, the received signal may be interpreted and forwarded via the inter-partition bridge to a selected SDR module for further processing.

Today, the wireless radio is a single discrete device attached to a peripheral component interface (PCI) bus in a processing system. It is exposed on a vulnerable bus and may be snooped, shares bandwidth with other devices, and is not extensible. Embodiments of the present invention overcome these disadvantages by providing for the instantiation of many hardware-protected SDR modules in sequestered partitions that execute on in-band/on-die core processing resources that may be software-upgraded in-band or out-of-band for the latest wireless communications protocols.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
   isolating at least one core of a general purpose, many core processing system as a sequestered partition, the sequestered partition being capable of being upgraded independently of non-isolated cores, the sequestered partition being hidden from at least one of an application program and an operating system executing on the non-isolated cores;
   mapping at least one software-defined radio module to the at least one isolated core, each of the at least one software-defined radio modules having its own section of memory in the many core processing system; and
   executing the at least one software-defined module by the at least one isolated core to implement at least one discrete function of wireless communications;
   wherein the method further comprises determining if a platform resource layer is enabled to sequester partitions in the many core processing system prior to isolating the at least one core.

2. The method of claim 1, wherein a plurality of cores are isolated, and at least one software-defined radio module is loaded onto each core, the discrete functions of the wireless communications for the processing system being performed in parallel across the plurality of isolated cores.

3. The method of claim 2, further comprising forwarding data between software-defined radio modules via an inter-partition bridge, the inter-partition bridge comprising a trusted channel of communications between two sequestered partitions according to a security policy.

4. The method of claim 1, wherein the at least one software-defined radio module performs a selected wireless communications signal processing function.

5. The method of claim 1, wherein isolating the core comprises programming advanced match range registers in the many core processing system to partition memory for the isolated core.

6. The method of claim 1, wherein mapping the at least one software-defined radio module to the core comprises securely loading the at least one software-defined radio module onto the core by verifying the integrity of the at least one software-defined radio module, and by detecting and deterring unauthorized attempts to change the at least one software-defined radio module.

7. An article comprising: a tangible machine-readable medium having stored thereon instructions that, when accessed via a machine, cause the machine to:
   isolate at least one core of a general purpose, many core processing system as a sequestered partition, the sequestered partition being capable of being upgraded independently of non-isolated cores, the sequestered partition being hidden from at least one of an application program and an operating system executing on the non-isolated cores;
   map at least one software-defined radio module to the at least one isolated core, each of the at least one software-defined radio modules having its own section of memory in the many core processing system; and
   execute the at least one software-defined module by the at least one isolated core to implement at least one discrete function of wireless communications;
   wherein the tangible machine-readable medium has instructions stored thereon that, when accessed via the machine, cause the machine to determine if a platform resource layer is enabled to sequester partitions in the many core processing system prior to isolating the at least one core.

8. The article of claim 7, further comprising instructions wherein a plurality of cores are isolated, and at least one software-defined radio module is loaded onto each core, the discrete functions of the wireless communications for the processing system being performed in parallel across the plurality of isolated cores.

9. The article of claim 8, further comprising instructions to forward data between software-defined radio modules via an inter-partition bridge, the inter-partition bridge comprising a trusted channel of communications between two sequestered partitions according to a security policy.

10. The article of claim 7, wherein the at least one software-defined radio module performs a selected wireless communications signal processing function.

11. The article of claim 7, wherein instructions to isolate the core comprise instructions to program advanced match range registers in the many core processing system to partition memory for the isolated core.

12. The article of claim 7, wherein instructions to map the at least one software-defined radio module to the core comprises securely loading the at least one software-defined radio module onto the core by verifying the integrity of the at least one software-defined radio module, and by detecting and deterring unauthorized attempts to change the at least one software-defined radio module.

13. A general purpose, many core processing system comprising:
   a plurality of general purpose processing cores;
   a memory divided into partitions; and
   a plurality of software-defined radio modules, one or more software-defined radio modules to be executed on one of the plurality of cores, each software-defined radio module to implement at least one discrete function of wireless communications, and each software-defined radio module to have its own partition of the memory;
   wherein cores to execute software-defined radio modules are isolated from other cores as sequestered partitions after a determination of whether a platform resource layer is enabled to sequester the partitions, each sequestered partition being capable of being upgraded independently of non-isolated cores, each sequestered partition being hidden from at least one of an application program and an operating system executing on the non-isolated cores.

14. The many core processing system of claim 13, further comprising an inter-partition bridge to forward data between software-defined modules, the inter-partition bridge comprising a trusted channel of communications between two sequestered partitions according to a security policy.

15. The many core processing system of claim 13, wherein each software-defined radio module is adapted to perform at least one selected wireless communications signal processing function.

16. The many core processing system of claim 13, further comprising advanced match range registers in the many core processing system to partition the memory for the isolated cores.

17. The many core processing system of claim 13, wherein the many core processing system is adapted to securely load each software-defined radio module onto an isolated core by verifying the integrity of each software-defined radio module, and is further adapted to detect and deter unauthorized attempts to change a software-defined radio module.

18. The method of claim 1, wherein isolating the core as the sequestered partition is performed by firmware of the processing system before the operating system is loaded by manipulating a physical memory map of the memory, and by providing the physical memory map to the operating system when the operating system is booted.

19. The method of claim 18, wherein isolating the core as the sequestered partition is performed by modifying an Advanced Configuration and Power Interface (ACPI) table passed to the operating system at boot time to exclude an identifier of the isolated core and the isolated core's Advanced Programmable Interrupt Controller.

20. The many core processing system of claim 13, the discrete functions of the wireless communications for the many core processing system to be performed in parallel across the plurality of isolated cores.

* * * * *